(12) United States Patent
Thielow et al.

(10) Patent No.: US 9,945,102 B2
(45) Date of Patent: Apr. 17, 2018

(54) DEVICE FOR EXTRACTING WATER FROM ATMOSPHERIC AIR

(71) Applicant: LOGOS-INNOVATIONEN GMBH, Bodnegg (DE)

(72) Inventors: Frank W. Thielow, Bodnegg (DE); Christian Thielow, Lindau (DE)

(73) Assignee: LOGOS-INNOVATIONEN GMBH, Bodnegg (DE)

( * ) Notice: Subject to any disclaimer, the term of this patent is extended or adjusted under 35 U.S.C. 154(b) by 0 days.

(21) Appl. No.: 14/911,025

(22) PCT Filed: Aug. 7, 2014

(86) PCT No.: PCT/EP2014/066956
§ 371 (c)(1),
(2) Date: Mar. 23, 2016

(87) PCT Pub. No.: WO2015/018880
PCT Pub. Date: Feb. 12, 2015

(65) Prior Publication Data
US 2016/0237659 A1    Aug. 18, 2016

(30) Foreign Application Priority Data
Aug. 9, 2013 (DE) .................. 10 2013 013 214

(51) Int. Cl.
*B01D 53/26* (2006.01)
*E03B 3/28* (2006.01)
(Continued)

(52) U.S. Cl.
CPC .............. *E03B 3/28* (2013.01); *B01D 53/263* (2013.01); *B01D 53/265* (2013.01); *F04B 35/01* (2013.01); *F04B 37/14* (2013.01)

(58) Field of Classification Search
CPC ....... B01D 53/263; B01D 53/265; E03B 3/28; F04B 35/01; F04B 37/14
See application file for complete search history.

(56) References Cited

U.S. PATENT DOCUMENTS

| | | | |
|---|---|---|---|
| 4,536,257 A * | 8/1985 | Atwell ................... | B01D 3/103 202/177 |
| 2006/0078438 A1* | 4/2006 | Wood ...................... | F04B 17/03 417/362 |

(Continued)

FOREIGN PATENT DOCUMENTS

| | | |
|---|---|---|
| AT | 009 239 U1 | 6/2007 |
| DE | 28 10 241 | 9/1979 |

(Continued)

*Primary Examiner* — Cabrena Holecek
(74) *Attorney, Agent, or Firm* — Breneman & Georges

(57) ABSTRACT

An apparatus for extracting water from atmospheric air by means of a flowable sorbent for the sorption of the water, wherein the sorption by way of the flowable sorbent (3) is provided at least along a sorption path (2) of the sorbent (3), wherein a sorbent (4) diluted with sorbed water (17) is provided at the end of the sorption path (2), wherein a separation unit (12) for at least partially separating the sorbed water (17) from the flowable sorbent (3, 4) is provided, wherein the separation unit (12) has at least one evaporator (12) for the evaporation of the sorbed water (17), is proposed, which apparatus can be operated in an energy-efficient manner and is not imperatively reliant on the presence of solar energy. This is achieved according to the invention in that the separation unit (12) has at least one negative-pressure compressor (16) for subjecting the diluted sorbent (4) to negative pressure.

9 Claims, 2 Drawing Sheets

Figure 1:
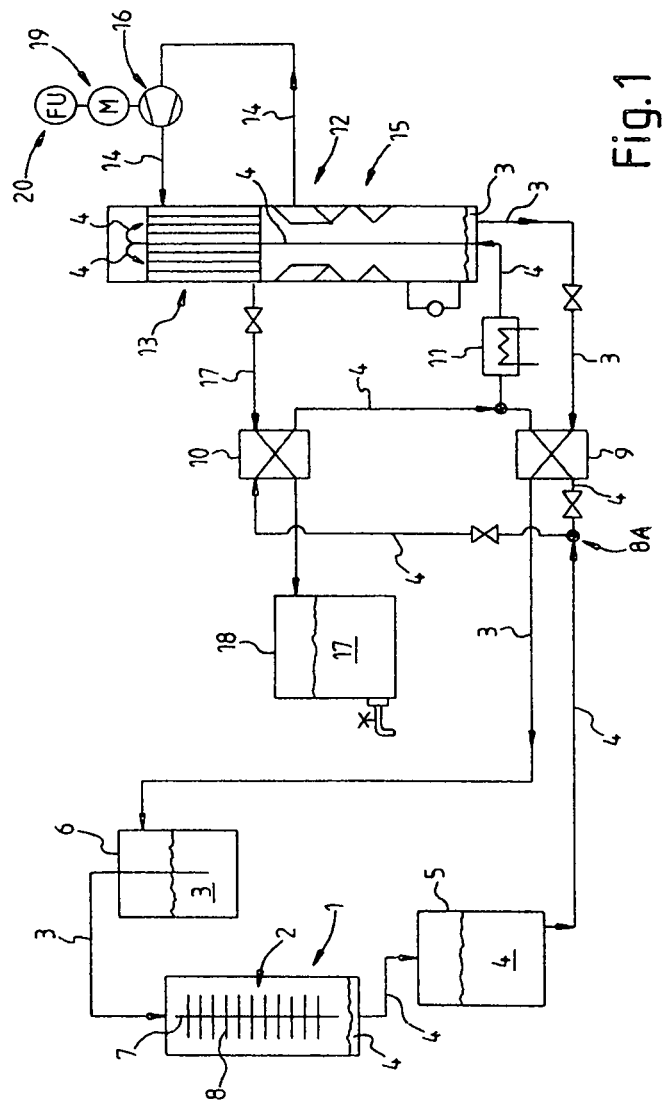

(51) Int. Cl.
   *F04B 35/01*    (2006.01)
   *F04B 37/14*    (2006.01)

(56) References Cited

U.S. PATENT DOCUMENTS

| | | | |
|---|---|---|---|
| 2006/0083627 A1* | 4/2006 | Manole | F04B 19/022 |
| | | | 417/245 |
| 2006/0130654 A1* | 6/2006 | King | B01D 5/003 |
| | | | 95/231 |
| 2006/0191411 A1* | 8/2006 | Johnson | B01D 53/263 |
| | | | 95/187 |
| 2010/0090356 A1* | 4/2010 | Sines | B01D 53/263 |
| | | | 261/29 |

FOREIGN PATENT DOCUMENTS

| | | |
|---|---|---|
| DE | 26 60 068 | 2/1980 |
| DE | 31 34 506 A1 | 3/1983 |
| DE | 285 142 | 12/1990 |
| DE | 42 31 301 | 4/1994 |
| DE | 198 32 182 A1 | 3/2000 |
| DE | 198 50 557 A1 | 5/2000 |
| DE | 103 09 110 A1 | 9/2004 |
| DE | 10 2004 026 334 A1 | 1/2005 |
| DE | 10 2008 023 566 A1 | 11/2009 |
| EP | 2 441 714 A1 | 4/2012 |
| FR | 2 561 759 | 9/1985 |
| WO | WO 2015/018880 A1 | 2/2015 |

* cited by examiner

DEVICE FOR EXTRACTING WATER FROM ATMOSPHERIC AIR

The invention relates to an apparatus for extracting water from atmospheric air according to the preamble of claim 1.

In many places on Earth, especially in semi-arid or arid regions, such as, for example, in parts of Israel, Egypt and the Sahel zone and in numerous hot deserts lying at a considerable distance from the ocean, there are, at least all year round, no stocks of drinking water. Here, besides the transportation of drinking water, the only possibility that exists is to provide it from moist air.

Condensers for extracting condensable water from atmospheric air by means of a coolable cold accumulator are already variously known, wherein the relatively moist atmospheric air is cooled to below the dew point (cf. German patent 28 10 241, DD 285 142 A5).

Furthermore, apparatuses are also known which bind atmospheric water in an absorption phase by means of an adsorptive or absorptive material, such as a salt, for example sodium chloride, or the like. In this case, the salt or the corresponding brine solution is generally stored in a liquid container, and the water level or the vertically viewed top side of the salt or brine is to be considered as the water-adsorbing or water-absorbing surface. In a desorption phase, this salt/water solution or brine is dehumidified in order to extract the drinking water, and the salt is made available again for absorption (cf. for example German patent 2 660 068, DE 198 50 557 A1). Disadvantages of these methods or apparatuses, however, are the comparatively large construction volume and the relatively low yield of drinking water per unit volume of the brine.

Furthermore, documents DE 103 09 110 A1 or DE 10 2004 026 334 A1 have already disclosed apparatuses with brine solutions which have a comparatively high yield per unit volume.

For such extraction of water from atmospheric air by way of a sorbent or a brine solution, it is however necessary to also provide a desorption or concentration of the brine solution. From the applicant's DE 10 2004 026 334 A1, it is already known that such a concentration process can be realized for example by way of a semipermeable membrane or an evaporator for the at least partial evaporation of the brine solution or of the diluted sorbent. Here, it is already proposed that, in arid or semi-arid areas, an evaporator can be operated particularly easily by way of solar thermal energy.

For climatically moderate regions, or for daytime and nighttime operation, however, the use or the availability of solar energy can be realized only with great outlay in terms of construction or investment.

OBJECT AND ADVANTAGES OF THE INVENTION

By contrast, it is an object of the invention to propose an apparatus for extracting water from atmospheric air by way of a flowable sorbent, in particular a brine solution with a hygroscopic salt for the sorption of the water, which apparatus can be operated in an energy-efficient manner and is not imperatively reliant on the presence of solar energy.

Taking an apparatus of the type mentioned in the introduction as a starting point, said object is achieved by way of the characterizing features of claim 1. Advantageous embodiment and refinements of the invention are possible by way of the measures specified in the subclaims.

Accordingly, an apparatus according to the invention is characterized in that the separation unit or the concentration unit has at least one negative-pressure compressor for subjecting the diluted sorbent to negative pressure.

With the aid of a negative-pressure compressor according to the invention, the diluted sorbent is advantageously subjected to negative pressure, such that an advantageous shift of the boiling point of the sorbent or of the brine solution is realized. This advantageous shift of the boiling point permits a particularly energy-efficient evaporation or concentration of the diluted sorbent or of the diluted brine solution. Accordingly, it is advantageously the case that less heat energy is required to evaporate the sorbed water out of the diluted brine solution or out of the diluted sorbent, which yields an improvement in energy or heat usage. In this way, it is for example advantageously possible to realize an advantageous evaporation, and thus an advantageous separation of the sorbed water from the atmospheric air, even when there is relatively little or no solar energy available.

On the other hand, it is also possible for the heat energy required for evaporating the sorbed water to be provided, or extracted from the system, or from the overall installation for extracting water from atmospheric air, with the aid of at least one advantageous heat exchanger, or from warm/hot operating media or operating medium flows. It is hereby possible for the processor circuit to be made less dependent, or entirely independent, of the availability of solar energy. For example, it is possible to realize advantageous daytime and nighttime operation, wherein, for example, it is by all means possible for solar energy to be used, and if appropriate stored in an advantageous manner, during the daytime.

It has been found that the subjecting of the sorbent to negative pressure according to the invention, or the shift of the boiling point, is of crucial significance specifically in the case of an installation or apparatus for extracting water from atmospheric air. It is thus possible in an advantageous manner for the sorbent to be conducted and operated in a circuit. For example, it is possible for the atmospheric water or the water from atmospheric air to be sorbed by way of the sorbent in a unit which comprises the sorption path, and, in accordance with the invention, the sorbed water can be separated or separated off by way of the separation unit or the negative-pressure compressor and the advantageous evaporator and supplied for advantageous further use as drinking and/or service water or irrigation water for plants or the like. The sorbent separated off from the sorbed water and thus re-concentrated, or the concentrated brine solution, is advantageously fed back to the unit or apparatus for sorbing the water from atmospheric air, and is thus conducted in a circuit. Any process-related losses of sorbent or brine solution may be compensated again, or replenished, punctually or from time to time.

The negative-pressure compressor is advantageously in the form of a reciprocating-piston unit with at least one piston which is movable in substantially linear fashion in a cylinder. In this way, an advantageous adaptation of the negative-pressure generation to the particular conditions of the apparatus according to the invention, and/or to the (diluted) sorbent and to the evaporation, is realized.

In a particular refinement of the invention, a drive apparatus of the piston has at least two diverting elements, which are spaced apart from one another and which are rotatable about in each case one drive spindle, and at least one endless circulating drive element which connects the two diverting elements. This means that a drive element which is closed during operation, such as a chain, a toothed belt, a band, a V-belt or the like is provided, which is laid or wrapped around at least two rollers, pinions, sprockets, drums, drive pulleys or the like. If appropriate, a tensioning element, in particular a tensioning screw, tensioning roller, third pinion or the like is provided in order to tension the drive element.

It is advantageously the case that a spacing of the two rotary or drive spindles of the two diverting rollers is greater, in particular several times greater, than a diameter of the one or more diverting elements. This makes it possible for the piston stroke or the stroke path of the piston to advantageously have a relatively long linear or rectilinear path/section.

As the drive apparatus circulates about the one or more diverting elements, the piston has a non-linear stroke speed. Otherwise, or in the region between the two diverting elements, the stroke speed is substantially constant or invariant. Such a uniform or invariant stroke speed of the piston over a relatively long section or path owing to the advantageous (large) spacing between the two rotary spindles or drive spindles of the diverting elements permits advantageous negative-pressure generation and evaporation in the evaporator. It is preferably the case that adaptation of the negative-pressure generation and of the evaporation is realized by way of a predefined spacing of the rotary or drive spindles of the diverting elements.

The circulating speed of the endless drive element is advantageously adapted to the sorbent and/or to the evaporation. If appropriate, a (regulable) motor, for example electric motor, combustion engine or Stirling engine, and/or a mechanism is provided for setting an advantageous circulating speed of the drive element.

In an advantageous variant of the invention, at least two drive apparatuses are provided so as to be arranged to both sides of the piston, wherein a connecting element to the piston is provided between the two endless circulating drive elements of the two drive apparatuses. In this way, an advantageous synchronous force distribution on the piston or on the piston rod is realized. This leads to advantageous guidance of the piston in the stroke cylinder during the stroke.

The cylinder is preferably pivotable about a pivot axis which is arranged perpendicular to the cylinder longitudinal axis. In this way, it is possible to dispense with a cumbersome direction reversal of the drive motor or of the drive apparatus. This is because, with this advantageous measure, it is for example possible for a drive motor to run, and drive the endless drive element, in only one direction during operation. That is to say, the piston that is arranged on the drive element or connected thereto is always driven in one direction. By means of the diameter of the diverting elements or of the pinions, rollers etc., a deflection or adjustment of the piston rod directed transversely with respect to the stroke is realized, which is advantageously made possible by way of a pivoting or rocking of the cylinder about the pivot axis, such that no disadvantageous transverse forces on the piston or cylinder are generated.

The negative pressure is advantageously generated or provided in or within the evaporator. A positive pressure of the negative-pressure compressor, which positive pressure is generated or provided on a positive-pressure side arranged opposite the negative-pressure side, is preferably provided for heating the separated-off or evaporated water.

In a particular embodiment of the invention, a heat exchanger is provided which at least partially uses the heat energy of the evaporated water for heating an operating medium, preferably the sorbent or the diluted brine solution. Thus, an advantageous heat exchanger wall is provided, on one, first side/surface of which the evaporated water is situated and on the other, second side/surface of which the (diluted) sorbent or the brine solution is situated. In this way, the energy efficiency of the system is improved.

The negative-pressure compressor may be designed as a single-acting piston compressor. The piston is preferably arranged between two pressure chambers of the cylinder. In this way, work can be performed on both sides of the piston or of the piston wall, or negative pressure can be generated on one side, and positive pressure can be generated on the other side, during a stroke. It is advantageously the case that control elements such as valves, in particular check valves, are provided or arranged at the one or more pressure chambers. In this embodiment, during a stroke, it is possible for a negative pressure to be generated in the evaporator and at the same time for a positive pressure to be generated for heating the evaporated water or for an advantageous heat exchanger.

The separation unit preferably has at least one condensation apparatus for condensing the separated-off water. In this way, the vaporous water can advantageously be liquefied. The cooling or condensation can be realized by way of an advantageous cooling wall. It is advantageously the case that at least one heat exchanger wall is arranged between the evaporator and the condensation apparatus. For example, the evaporator and the condensation apparatus and/or the heat exchanger are arranged in a common structural unit. In this way, it is possible to implement numerous advantageous synergistic effects and a high level of energy efficiency. This leads to improved energy efficiency and to a mode of operation which is expedient both from a structural aspect and from an economic aspect.

In an advantageous embodiment of the invention, between the sorption path and the separation unit, there is arranged at least one preheating unit for the preheating of the diluted sorbent. Said preheating unit is of great significance inter alia for a so-called "cold start" of the apparatus in order to heat the diluted sorbent or the brine solution for the evaporator to operating temperature. For example, a (separate) preheater may be designed as a burner and/or electric heater and/or solar collector.

The preheating unit preferably has at least one heat exchanger for the exchange of heat between the diluted sorbent and the separated-off water and/or the flowable sorbent. Said heat exchanger(s) is/are of great advantage in particular during operation. In this way, it is possible in particular for warm/hot operating medium flows to provide their heat energy in an advantageous manner for the (pre) heating of the diluted sorbent. For example, the condensed water and/or the concentrated sorbent or brine solution may release at least a part of its residual heat to the diluted sorbent (in each case) by way of a heat exchanger.

EXEMPLARY EMBODIMENT

An exemplary embodiment of the invention is illustrated in the drawing and will be discussed in more detail below on the basis of the figures, in which, in detail:

FIG. 1 shows a schematic flow diagram of an apparatus according to the invention, and FIGS. 2a), b), c) and d) shows multiple schematic views of a negative-pressure compressor according to the invention.

FIG. 1 schematically shows a flow diagram of an apparatus according to the invention having a sorption unit 1. Within the sorption unit 1 there is provided a sorption path 2 of a sorbent 3 or of a brine solution 3, for example a lithium chlorite solution 3. The sorption unit 1 is for example an apparatus as per DE 103 09 110 A1 or DE 10 2004 026 334 A1.

Accordingly, the sorbent 3 or the brine solution 3 is fed to the sorption unit 1 preferably from an accumulator 6 or tank 6 and flows along the sorption path 2 preferably along one or several guide elements 7 which have numerous distributor elements 8 for increasing a surface area and thus lengthening the residence time. Here, the sorbent 3 or the brine solution 3 sorbs water from atmospheric air, such that, at the end of the sorption path 2, diluted sorbent 4 or diluted brine solution 4 is present and is preferably stored in an accumulator 5 or tank 5.

The diluted sorbent 4 or the diluted brine solution 4 is conducted to a branching point 8A and is thereby conducted via a first and a second heat exchanger 9, 10 and an advantageous electric and/or solar preheater 11 to a separator unit 15 which includes an evaporator 12, in particular an evaporator 12 with a negative pressure side and/or a falling-flow evaporator 12. The preheater 11 is provided in particular for heating the diluted sorbent 4 during a "cold start" or start-up of the system in order to attain the corresponding boiling temperature or boiling conditions. During operation, the preheater 11 can be throttled in terms of heating power, or deactivated, owing to the heat energy of the fluid flows involved or of the water vapor 14, sorbent 3 etc.

Typically, the fluid to be evaporated or the diluted sorbent 4 or the diluted brine solution 4 is supplied to the evaporator 12 from below, but is fed in above a pipe bundle 13. By way of a suitable distributor device, said fluid is distributed as uniformly as possible across multiple pipes of the pipe bundle 13. The distributor should be designed such that a minimal and/or uniform irrigation density is ensured.

In general, the evaporation takes place on the pipe inner side of the pipes of the pipe bundle 13. The variants may however also be realized in which the fluid is evaporated on the pipe outer side. The liquid film or the diluted sorbent 4 or the diluted brine solution 4 advantageously flows down the pipe wall under the action of gravitational force, and forms an as far as possible coherent liquid film with different flow states. As heating medium 14, use is generally made of heating steam 14 which condenses on the pipe outer side of the pipe bundle 13 and which flows downward in the same flow direction. The heating medium 14 is preferably evaporated water 14 or vaporous water 14, that is to say water vapor 14, that has been separated off from the diluted sorbent 4 or from the diluted brine solution 4.

The concentrated sorbent 3 or the brine solution 3 is advantageously separated, at the lower end, in a separator 15 and fed via the first heat exchanger 9 to the supply tank 6 or accumulator 6. Thus, residual heat of the sorbent 3 or of the brine solution 3 originating from the falling-flow evaporator 12 or separator 15 can be used for preheating the diluted sorbent 4 or the diluted brine solution 4.

Furthermore, in the separator 15, evaporated water 14 is extracted separately from the sorbent 3, or drawn in by way of a negative-pressure compressor 16, and fed at positive pressure to the falling-flow evaporator 12 or to the pipe bundle 13, that is to say the condensation unit 13 or the condensation surface. Accordingly, heat transfer takes place at the pipe bundle 13, such that the evaporated water 14 that has been additionally heated slightly by the positive pressure releases a part of its heat to the relatively cold or cold pipe bundle wall or outer side of the pipes, and hereby advantageously additionally heats the diluted sorbent 4 or the diluted brine solution 4 to the boiling point within the falling-flow evaporator 12.

For example, a pressure of approximately 0.6 bar at a temperature of approximately 86° C. is generated by the negative-pressure compressor 16 on the suction side or in the evaporator. By contrast, on the pressure side of the negative-pressure compressor 16, a pressure of approximately 1 bar at a temperature of approximately 115° C. is generated, and the water vapor 14 is fed/forced into the falling-flow evaporator 12 or the pipe bundle 13. The negative-pressure compressor 16 is advantageously controllable, and/or regulable by way of a frequency inverter 20 of its electric motor 19.

Owing to the negative pressure of approximately 0.6 bar, a lowering of the boiling point of the diluted sorbent 4 or of the diluted brine solution 4 is generated, such that this evaporator is already at the temperature of approximately 86° C. In this way, heating energy for evaporation purposes is advantageously saved.

Condensed water 17 is discharged from the falling-flow evaporator 12 and fed via the second heat exchanger 10 to a water tank 18 or accumulator 18. Said water 17 can advantageously be used for drinking and/or irrigation, washing or the like, and originates substantially from the atmospheric air. This means that said water 17 is extracted from the air, and separated off from the sorbent 3 or 4, in particular for human use. By contrast, the sorbent 3 or the brine solution 3 is conducted substantially in a circuit and is reused multiple times. Any sorbent losses that occur are compensated.

Aside from the schematically illustrated components of the system, further pressure pumps or motors for circulatory pumping of the operating fluids 3, 4, 17 may be advantageous. Likewise, advantageous sensors for temperature, pressure, level of the accumulator 5, 6, 18, 12 etc. may advantageously be used at different or suitable locations/positions, in particular for an automated mode of operation. Valves other than those schematically illustrated, in particular check valves and/or directional valves, may also be advantageous.

Figure 2:
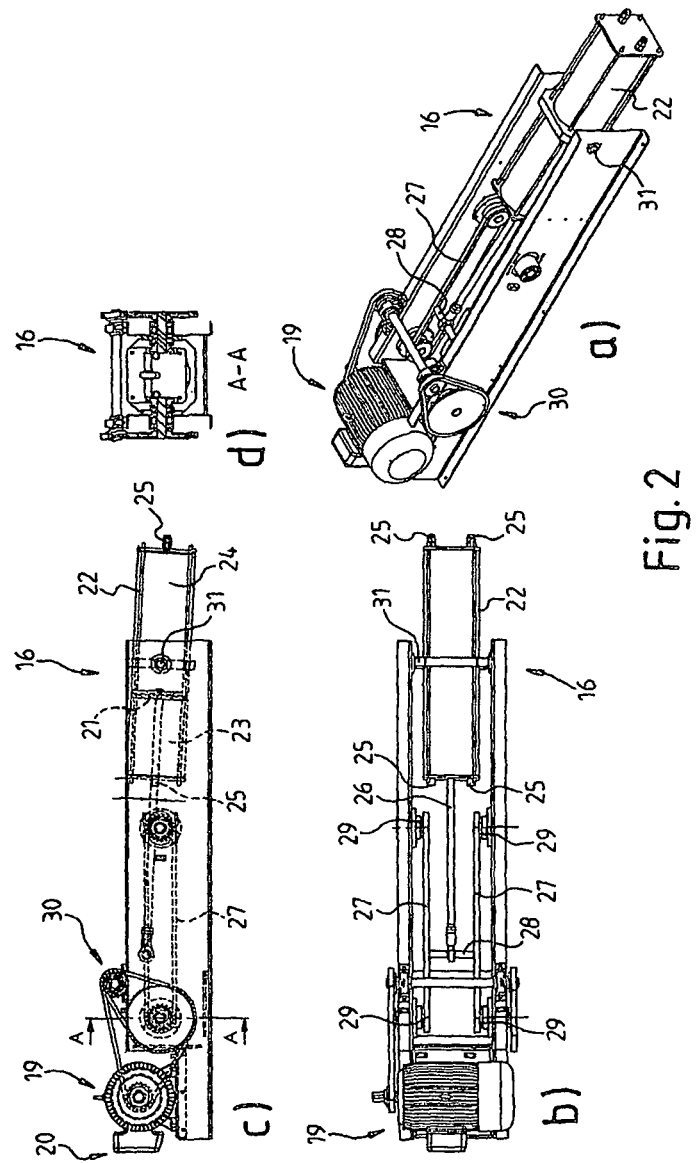

FIG. 2 schematically illustrates an advantageous variant of the negative-pressure compressor 16 with electric motor 19 and frequency inverter 20. Said negative-pressure compressor is in the form of a reciprocating-piston compressor 16 which has a piston 21 and a cylinder 22. The piston 21 is adjusted linearly within the cylinder 22 and has a linear stroke/adjustment path.

It is preferable for two pressure chambers 23, 24 to be provided which are arranged to both sides of the piston 21, wherein said pressure chambers each have an inlet and an outlet with check valves 25. Thus, during every stroke, in each case one pressure chamber 23, 24 is charged with negative pressure and the other is charged with positive pressure. The suction side is connected in each case to the evaporator 13, and the positive-pressure side is connected to the condenser surface of the falling-flow evaporator 12.

In the case of the negative-pressure compressor 16 illustrated, it is particularly advantageous that the piston 21 is driven by way of a piston rod 26 and, in the present case, by way of two chains 27. Said two chains 27 are arranged to both sides and are connected to the piston rod 26 by way of a connector 28. The chains 27 are wrapped around, and connect, in each case two sprockets 29, such that the chains 27 each have a diverting region and a linear region between the sprockets 29 or diverting elements 29. For example, the spacing of the rotary spindles of the sprockets 29 is approximately 1 meter, such that the stroke or adjustment path of the piston 21 is likewise approximately 1 meter.

The gearwheels 29 are driven by the motor 19 via a mechanism 30. During operation, the motor 19 and thus the chains 27 run in one direction, such that the connector 28 and thus the piston 21 perform a forward movement and a rearward movement during one revolution of the chains 27. Furthermore, the connector 28 or the chains 27 perform a semicircular movement, and at the same time a movement directed transversely with respect to the stroke, in the region of the sprockets 29. For this purpose, the cylinder has an advantageous pivot spindle 31 such that the cylinder participates in the vertical or transverse directed movement and performs a rocking movement during the circulating operation of the chains 27.

In the case of a stroke of approximately 1 meter and the relatively small diameter of the sprockets 29, the stroke speed is linear or uniform over the major part of the adjustment path, or over a very long adjustment path, of the piston 21. Said uniform stroke speed surprisingly makes it possible for the diluted sorbent 4 in the evaporator 12 to be subjected to positive pressure and/or negative pressure, and to be evaporated, in a particularly advantageous manner. It has been found that, in this way, it is possible to realize particularly energy-efficient desorption or separation of the sorbent 3 from the sorbed water 17 in a manner independent of, or at least less dependent on, solar energy.

LIST OF REFERENCE DESIGNATIONS

1 Sorption unit
2 Sorption path
3 Sorbent
4 Diluted sorbent
5 Tank
6 Tank
7 Guide element
8 Distributor
9 Heat exchanger
10 Heat exchanger
11 Preheater
12 Falling-flow evaporator
13 Pipe bundle
14 Water vapor
15 Separator
16 Compressor
17 Water
18 Tank
19 Electric motor
20 Frequency inverter
21 Piston
22 Cylinder
23 Pressure chamber
24 Pressure chamber
25 Valve
26 Piston rod
27 Chain
28 Connector
29 Sprocket
30 Mechanism
31 Pivot spindle

What is claimed is:

1. In an apparatus for extracting water from atmospheric air having a flowable sorbent for the sorption of water along a sorption path (2) to form a sorbent (4) diluted with sorbed water (17) at the end of the sorption path (2), and a separation unit having at least one evaporator (12) for at least partially separating the sorbed water (17) from the flowable sorbent (3, 4) wherein the improvement comprises a reciprocating piston (21) disposed in a cylinder having two pressure chambers (23, 24) with a positive pressure chamber (23) in axial alignment with a negative pressure chamber (24) configured to simultaneously produce a usable positive pressure from the positive pressure chamber and a usable negative pressure from the negative pressure chamber and wherein the separation unit (15) has at least one negative-pressure evaporator (13) connected to the usable negative pressure chamber for subjecting the diluted sorbent (4) to negative pressure and the usable positive pressure chamber is connected to the at least one evaporator (12).

2. The apparatus as claimed in claim 1 further comprising a drive apparatus for the reciprocating piston (21) having at least two diverting elements (29).

3. The apparatus as claimed in claim 1 further comprising at least two drive apparatuses disposed on both sides of the reciprocating piston (21).

4. The apparatus as claimed in claim 1 wherein the reciprocating piston is disposed in the cylinder (22) which is pivotable about a pivot axis (31) arranged perpendicular to the cylinder longitudinal axis.

5. The apparatus as claimed in claim 1 wherein the at least one negative pressure evaporator is a falling flow evaporator.

6. The apparatus as claimed in claim 1 wherein the separation unit (15) has at least one condensation apparatus for condensing separated-off water (14).

7. The apparatus as claimed in claim 6 further comprising at least one heat exchanger wall arranged between the at least one evaporator (12) and the condensation apparatus (13).

8. The apparatus as claimed in claim 1 further comprising least one preheating unit (9, 10, 11) for the preheating of the diluted sorbent (4) disposed between the sorption path (2) and the at least one evaporator (12).

9. The apparatus as claimed in claim 8 wherein the preheating unit (9, 10, 11) has at least one heat exchanger (9, 10) for the exchange of heat between the diluted sorbent (4) and separated-off water (14, 17) and/or the flowable sorbent (3).

* * * * *